J. McDONALD.
Bee Hive.
No. 79,243.
Patented June 23, 1868.
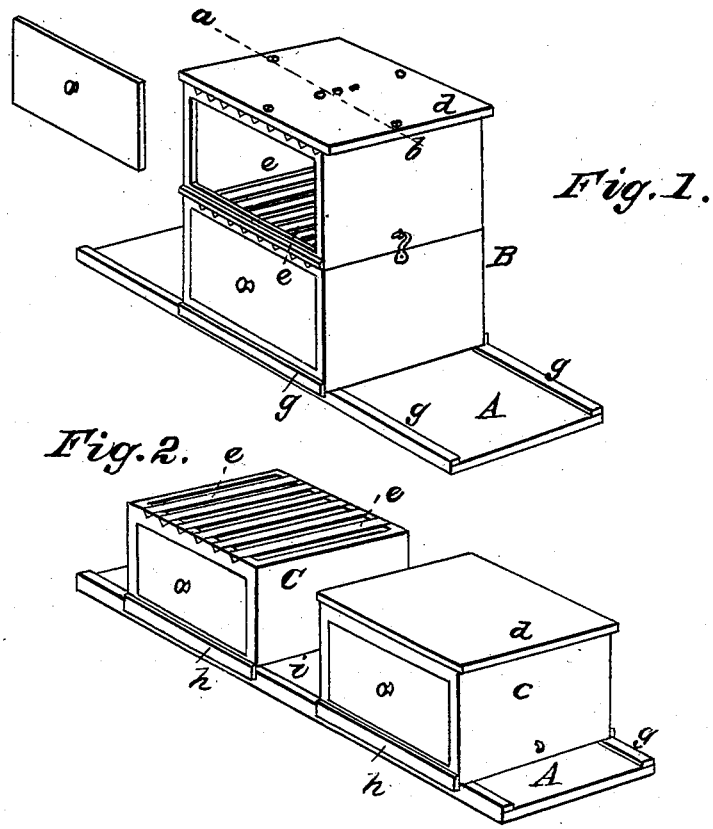
Fig. 1.
Fig. 2.
Fig. 3.
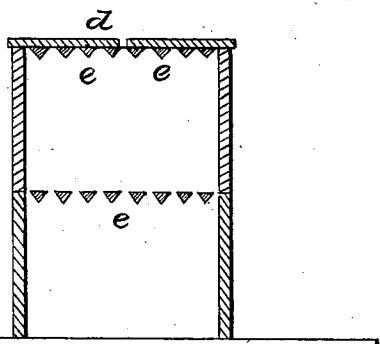
Witnesses:
Chas. H. Poole
D. C. Colby
Inventor:
Jacob McDonald

United States Patent Office.

JACOB McDONALD, OF BUFFALO, OHIO.

Letters Patent No. 79,243, dated June 23, 1868.

IMPROVEMENT IN BEE-HIVES.

The Schedule referred to in these Letters Patent and making part of the same.

TO ALL WHOM IT MAY CONCERN:

Be it known that I, JACOB McDONALD, of Buffalo, Guernsey county, Ohio, have invented new and useful Improvements in Bee-Hives; and I do hereby declare the following to be a full and exact description of the same, reference being had to the drawings that accompany and form a part of these specifications, in which—

Figure 1 is a perspective view of my double hive, ready for use, with one window shown.

Figure 2 is a view of my hive, with the two sections C C separated, and arranged side by side, for dividing or colonizing my bees, to prevent swarming.

Figure 3 is a vertical bi-sectional view of my double hive, cut on the line $a\,b$ of fig. 1.

The object of my invention is to provide for colonizing or dividing my bees in spring, and prevent swarming and loss of bees.

The nature of my invention consists in making a double hive, of two equal parts, C C, as shown in fig. 1. The sections are exactly alike, each being of sufficient capacity to accommodate a colony, and each a perfect hive of itself, as shown in fig. 2, and united in a double hive, as shown in figs. 1 and 3.

I make an alighting and guiding-board, A, with side-strips $g\,g$, to cause my bees to leave and enter my hive from two sides only; and I place my hive so they will be to the east and west.

My hive stands on the strips $g\,g$, as shown in figs. 1 and 2, so that the entrances are of equal size and amply large.

To divide or colonize my bees, I take the hive, when signs of swarming are shown, move it towards one end of my alighting-board, A, and remove the top section, and place it on the alighting-board by the side of the bottom section, and put the little board $i$ between the two sections, to cut off communication between them. This I do at noon, when most of the workers are absent. I also place a cap on bottom section, and thus have two hives side by side, as shown in fig. 2.

When the workers return, those going from one side in the morning will enter one section, while those going from the other side will enter the other section, or hive, as it now is, and I have two colonies, fully separated and divided, and with no trouble or disturbance to the bees.

In a few days, when they need more room, I raise the two sections, and place new and empty ones beneath them, and have two double hives where I had one, and thus prevent swarming, which is the great end desired.

Having thus fully described my invention, what I claim is—

The guiding-board A, with side-strips $g\,g$, the two sections C C, and cross-board $i$, for the use and purpose as specified and herein set forth.

JACOB McDONALD.

Witnesses:
D. C. COLBY,
CHAS. H. POOLE.